(12) United States Patent
Huang et al.

(10) Patent No.: US 7,701,704 B2
(45) Date of Patent: Apr. 20, 2010

(54) DATA STORAGE DEVICE AND A SUPPORT THEREOF

(75) Inventors: Tsung-Chi Huang, Jhonghe (TW); Heng-Chih Yen, Chungho (TW)

(73) Assignee: Infortrend Technology, Inc., Taipei Hsien (TW)

( * ) Notice: Subject to any disclaimer, the term of this patent is extended or adjusted under 35 U.S.C. 154(b) by 547 days.

(21) Appl. No.: 11/369,823

(22) Filed: Mar. 8, 2006

(65) Prior Publication Data
US 2007/0211423 A1    Sep. 13, 2007

(51) Int. Cl.
*G06F 1/16* (2006.01)
(52) U.S. Cl. .................................. 361/679.36
(58) Field of Classification Search ............... 361/685, 361/727, 728, 729, 730, 732, 735, 679.33–679.37; 248/618, 633, 634, 636, 638, 694
See application file for complete search history.

(56) References Cited

U.S. PATENT DOCUMENTS

| | | | | | |
|---|---|---|---|---|---|
| 4,012,089 | A | * | 3/1977 | Ward | 312/236 |
| 4,683,520 | A | * | 7/1987 | Grassens et al. | 361/825 |
| 4,713,714 | A | * | 12/1987 | Gatti et al. | 360/137 |
| 5,142,447 | A | * | 8/1992 | Cooke et al. | 361/685 |
| 5,319,519 | A | * | 6/1994 | Sheppard et al. | 361/685 |
| 5,332,306 | A | * | 7/1994 | Babb et al. | 312/334.16 |
| 5,398,157 | A | * | 3/1995 | Paul | 361/684 |
| 5,469,311 | A | * | 11/1995 | Nishida et al. | 360/97.02 |
| 5,552,946 | A | * | 9/1996 | Bicknese et al. | 360/97.01 |
| 5,654,873 | A | * | 8/1997 | Smithson et al. | 361/685 |
| 5,858,509 | A | * | 1/1999 | Polch et al. | 428/166 |
| 5,926,366 | A | * | 7/1999 | Collins et al. | 361/685 |
| 6,005,768 | A | * | 12/1999 | Jo | 361/685 |
| 6,052,278 | A | * | 4/2000 | Tanzer et al. | 361/679.33 |
| 6,084,768 | A | * | 7/2000 | Bolognia | 361/685 |
| 6,130,817 | A | * | 10/2000 | Flotho et al. | 361/685 |
| 6,134,113 | A | * | 10/2000 | Mills et al. | 361/725 |
| 6,154,361 | A | * | 11/2000 | Anderson et al. | 361/685 |
| 6,209,842 | B1 | * | 4/2001 | Anderson et al. | 248/560 |
| 6,249,432 | B1 | * | 6/2001 | Gamble et al. | 361/685 |
| 6,288,902 | B1 | * | 9/2001 | Kim et al. | 361/725 |
| 6,339,532 | B1 | * | 1/2002 | Boulay et al. | 361/685 |
| 6,445,587 | B1 | * | 9/2002 | Pavol | 361/727 |
| 6,567,265 | B1 | * | 5/2003 | Yamamura et al. | 361/685 |
| 6,580,604 | B1 | * | 6/2003 | McAnally et al. | 361/685 |
| 6,600,648 | B2 | * | 7/2003 | Curlee et al. | 361/679.34 |
| 6,606,242 | B2 | * | 8/2003 | Goodman et al. | 361/685 |
| 6,612,667 | B2 | * | 9/2003 | Tsai et al. | 312/223.1 |
| 6,717,816 | B1 | * | 4/2004 | Tanaka et al. | 361/728 |
| 6,914,778 | B2 | * | 7/2005 | Deckers et al. | 361/685 |
| 7,012,805 | B2 | * | 3/2006 | Shah et al. | 361/685 |
| 7,092,250 | B2 | * | 8/2006 | Chen et al. | 361/685 |
| 7,142,419 | B2 | * | 11/2006 | Cochrane | 361/685 |
| 7,251,099 | B2 | * | 7/2007 | Kao et al. | 360/97.01 |
| 7,307,838 | B2 | * | 12/2007 | Chen et al. | 361/685 |
| 2005/0168933 | A1 | * | 8/2005 | Lee | 361/685 |

* cited by examiner

*Primary Examiner*—Lisa Lea-Edmonds
(74) *Attorney, Agent, or Firm*—Rosenberg, Klein & Lee

(57) ABSTRACT

The present invention relates to a data storage device and a support therein. The support is provided with a hollow portion. The hollow portion is provided with a damping spacer therein for attenuating vibration, thereby to reduce the lateral space occupied by the lateral sides of the support, and to increase the usable lateral space for accommodating electronic device and thus to increase the number of the accommodated electronic devices.

32 Claims, 6 Drawing Sheets

DATA STORAGE DEVICE AND A SUPPORT THEREOF

BACKGROUND OF THE INVENTION

1. Field of the Invention

The present invention relates to a data storage device and a support thereof, and in particular, to a data storage device provided with a support for supporting an electronic device module and the support thereof.

2. Description of Prior Art

The interior of the housing of the conventional data storage device is provided with a plurality of supports for supporting an electronic device such as a disk drive that is mounted therein. In order to increase structural rigidity and conductivity, the support and the cartridge of the electronic device are mostly made of metal materials, and thus it is necessary to provide a vibration-attenuating means between the cartridge of the electronic device and the support. The vibration-attenuating means is usually made of a sheet-like resilient material. The resilient patch disclosed in U.S. Pat. No. 6,445,587 is stuck onto the support and the lateral side adjacent to the cartridge of the electronic device, so that the elasticity of the resilient patch can absorb the vibration between the support and the cartridge of the electronic device. In this way, the vibration and the noise can be reduced.

However, the conventional resilient patch needs to have a significantly large thickness. When the resilient patch is stuck onto the lateral side of the support, it is necessary for the resilient patch to occupy the space between the supports so as to reduce the remaining space. That is to say, the usable space in the housing for mounting the electronic device is reduced, so that the number of the accommodated electronic devices is relatively reduced. Especially, with regard to the data storage device having limited accommodating space, it is undoubtedly a big problem. In general, the housings of the data storage devices are usually set in a server rack, and the width of the standard server rack in a transverse direction is 450 mm, so that the housings of the data storage devices having a maximum transverse width of 450 mm can be positioned in the server rack, and the transverse width of the housings of the data storage devices is mostly made to be 445 mm or less; otherwise, it is not easy for the housings of the data storage devices to be positioned into the server rack. Therefore, the housing of the conventional data storage device is designed to accommodate at most five 2.5" hard disk drives that are positioned horizontally in the transverse direction.

SUMMARY OF THE INVENTION

The object of the present invention is to provide a data storage device and the support thereof capable of reducing the space occupied by lateral sides of the support, increasing the number of the accommodated electronic devices, and efficiently reducing the friction, vibration and noise.

In order to achieve the above object, the present invention provides a data storage device comprising: a housing; a plurality of supports provided within the housing at intervals, each support provided with at least one hollow portion, the hollow portion provided with a damping spacer therein; and a plurality of electronic device modules accommodated between the supports, wherein the damping spacer is in slidable contact with lateral sides of the electronic device modules.

The present invention further provides a support within the data storage device. The support is provided with at least one hollow portion. The hollow portion is provided with a damping spacer that is in slidable contact with a lateral side of the electronic device modules that are positioned in the data storage device.

DETAILED DESCRIPTION OF THE PREFERRED EMBODIMENT

Figure 1:
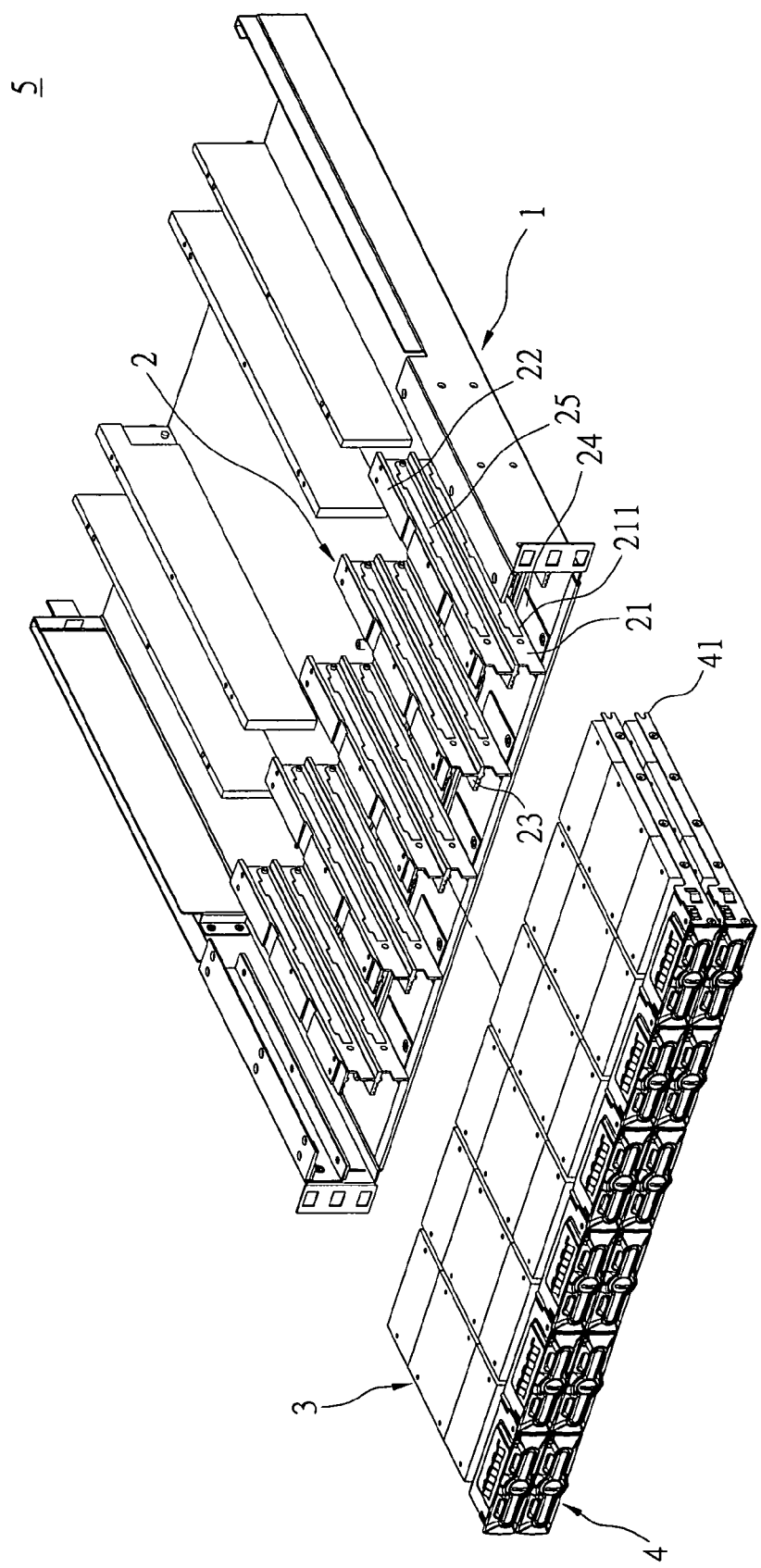
FIG. 1 is an exploded perspective view of a data storage device of the present invention, in which the internal structure without a top cover is displayed.
Figure 2:
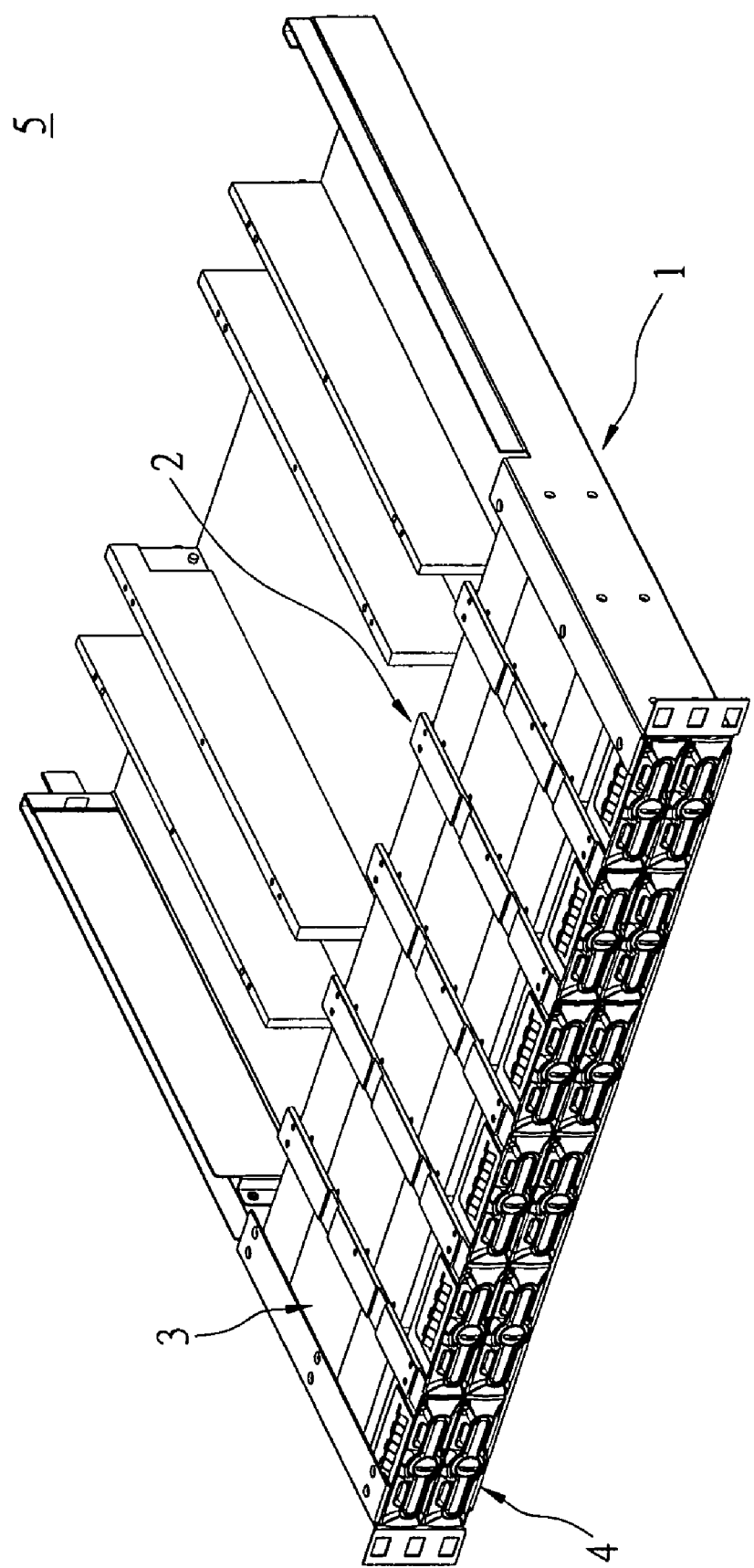
FIG. 2 is a partially exploded perspective view showing the data storage device of the present invention without the top cover.

Regarding an embodiment of the present invention, please refer to FIG. 1 and FIG. 2, which are exploded perspective view and assembled perspective view of the data storage device of the present invention without a top cover. The data storage device comprises a housing 1, in which the top cover is removed and thus is not shown in the figures. The interior of the housing 1 is provided with at least one support 2. In the present embodiment, a plurality of supports 2 are provided. These supports 2 are provided, at identical intervals, within the housing 1 along the transverse direction. An electronic device module 5 is provided between two adjacent supports 2. In another embodiment, these supports are provided at different intervals and are fixed into the interior of the housing 1. The electronic device module comprises at least one electronic device 3 (such as disk drive, tape drive or optical disk drive) and a removable carrier 4. The electronic device 3 is mounted on the removable carrier 4. The electronic device module 5 can be removably supported on the support 2 within the housing 1, so that the electronic device 3 can be removably mounted on the housing 1. In one embodiment, the removable carrier can be a carrier having a bottom portion on which the electronic device 3 is supported. In another embodiment, the removable carrier can be a carrier having supporting portions on both sides thereof for supporting the electronic device 3.

Figure 3:
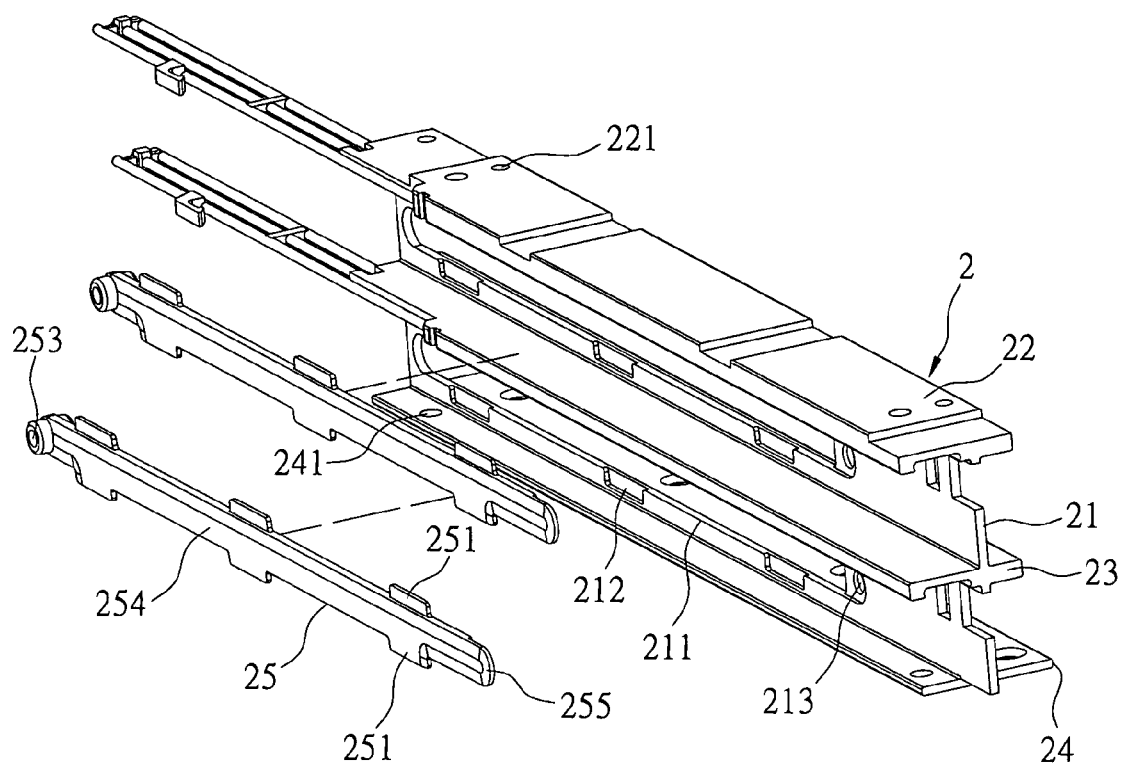
FIG. 3 is an exploded perspective view showing a support of the present invention.
Figure 4:
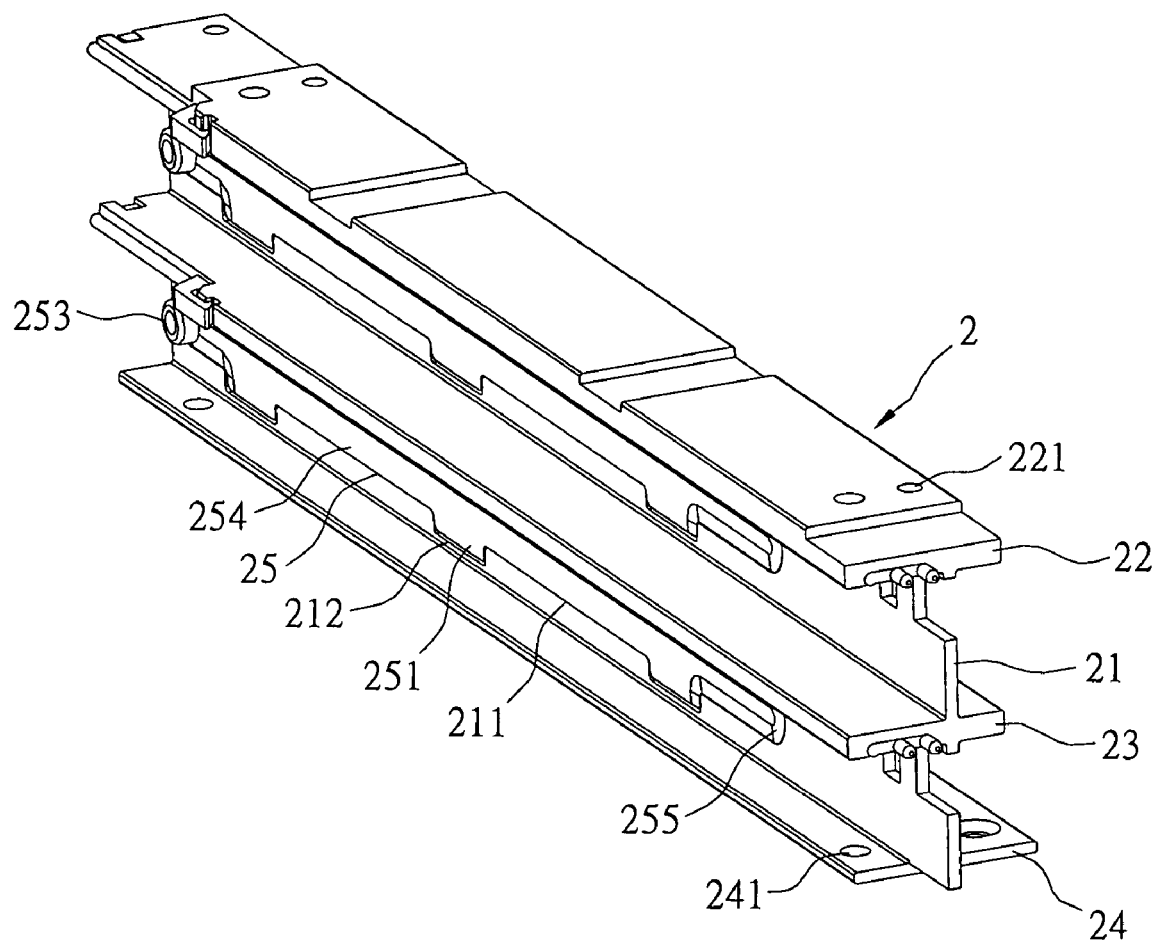
FIG. 4 is an assembled perspective view of the support of the present invention.
Figure 5:
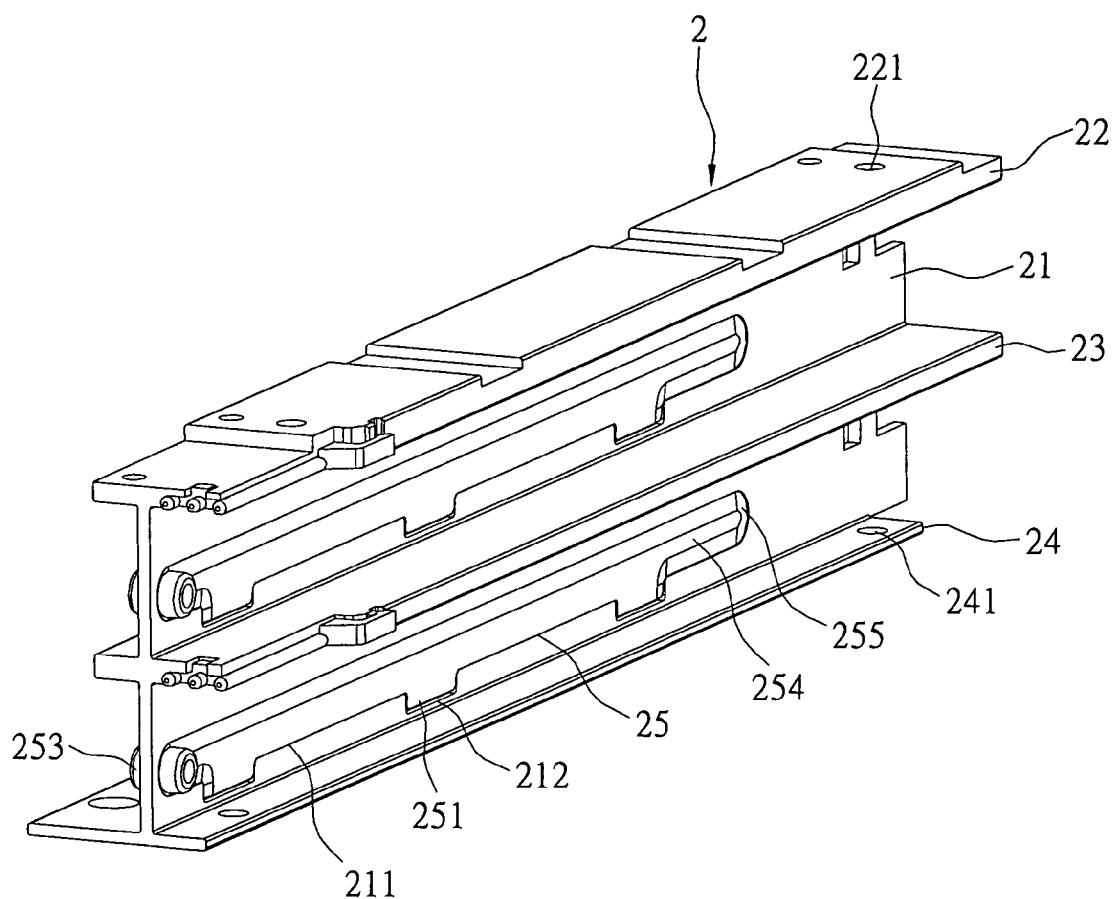
FIG. 5 is an assembled perspective view of the support of the present invention seen from another viewing angle.

With reference to FIGS. 3, 4 and 5, which are exploded perspective view, assembled perspective view and assembled perspective view seen from another viewing angle of the support of one embodiment of the present invention. In the present embodiment, the support 2 is of a multi-layer (such as two-layer) structure. Each layer between two supports 2 is used to support one electronic device module 5, so that an upper and a lower electronic device modules 5 can be supported between the two supports 2 each having the two-layer structure. Furthermore, in the embodiment, the support 2 having a multi-layer structure is integrally formed, is of an elongated shape and is made of metal materials, such as aluminum. The support has a main body 21 and a plurality of supporting portions 22, 23, 24. In another embodiment, the support can be constructed by an assembled structure; in other words, after a single-layer support is manufactured one by one, two single-layer supports can be assembled to form a two-layer support. Alternatively, a plurality of single-layer supports are assembled to form a multi-layer support. In another embodiment, the support can be made of iron material, other metal materials or non-metal materials.

The main body 21 is an elongated plate-like body. The main body 21 is provided with at least one hollow portion 211. In the embodiment, two hollow portions 211 are provided. The hollow portion 211 penetrates through lateral sides of the main body 21 and extends, along the longitudinal direction of the main body 21, to the proximity of the front and rear ends of the main body 21. The upper side and the lower side of the hollow portion 211 are provided with a plurality of latching notches 212, respectively. The latching notches 212 are provided at intervals. The latching notches 212 on the upper side and the lower side of the hollow portion 211 are provided on both lateral sides of the main body 21, respectively, so that the latching notches 212 on the upper side and the lower side of the hollow portion 211 are alternatively provided. At one end (front end) of the hollow portion 211 is provided with a positioning hole 213.

These supporting portions 22, 23 and 24 are elongated plate-like body and are in integral connection to the upper end, middle and the lower end of the main body 21. The supporting portions 22, 23 and 24 are perpendicular to the main body 21 and extend transversely in a horizontal direction to project from both lateral sides of the main body 21, thereby to support the electronic device module 5 and/or to be connected to the top cover (not shown) and/or a bottom cover of the housing 1. In the embodiment, the supporting portions 22 and 24 are connected and supported to the top cover (not shown) and the bottom cover. The supporting portions 23 and 24 project from the two lateral sides of the main body 21 for supporting the bottoms of two adjacent electronic device modules 5 provided on both sides of the support 2. The supporting portions 22 and 24 on the upper end and the lower end are provided with a plurality of fixing holes 221 and 241, respectively. Therefore, screws and/or rivets can be used to fix the support 2 into the housing 1. In the embodiment, the support 2 has a two-layer structure and thus is provided with three supporting portions 22, 23 and 24. In another embodiment, the support 2 has a single-layer structure and thus is only provided with an upper and a lower supporting portions for being connected to the upper end and the lower end of the main body 21, respectively. In another embodiment, the support 2 has a multi-layer structure and thus is provided with the supporting portions at corresponding positions for being connected to the proper positions, upper end and lower end of the main body 21, respectively.

Figure 6:
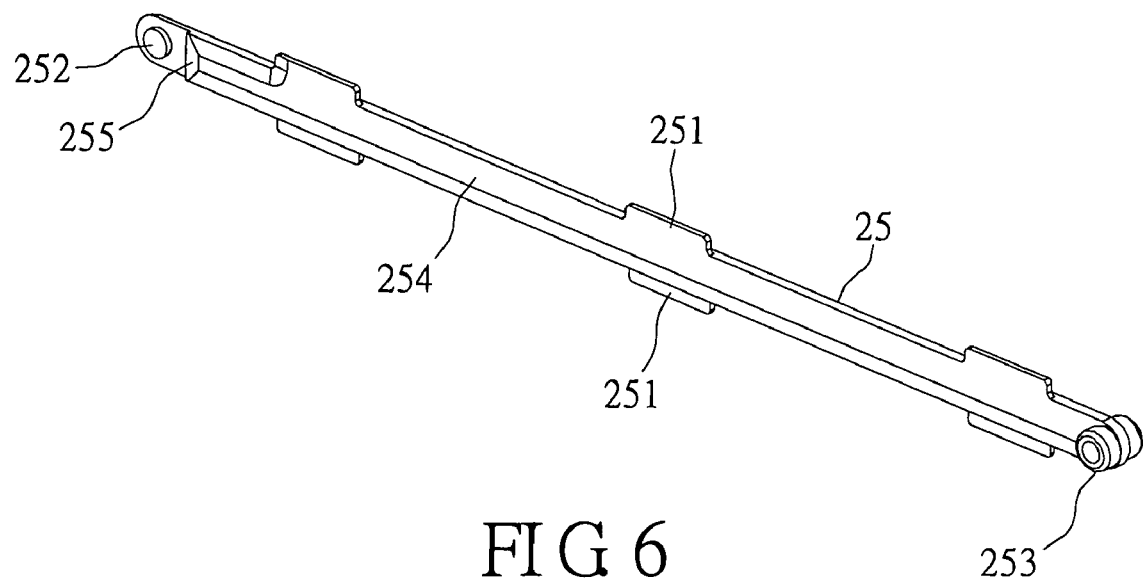
FIG. 6 is a perspective view of a damping spacer of the present invention.

In the embodiment, the hollow portion 211 of the support 2 is provided with a damping spacer 25. The damping spacer 25 is made of a soft material having a certain hardness and toughness and a lower frictional coefficient, such as polypropylene (P.P.) of plastic materials. In another embodiment, it can be made of rubber materials. In the embodiment, the damping spacer 25 is an elongated sheet. The shape of the damping spacer 25 substantially corresponds to that of the hollow portion 211. The upper side and the lower side of the damping spacer 25 are provided with a plurality of latching pieces 251 that correspond to the latching notches 212 (as shown in FIG. 6). The latching pieces 251 are provided at intervals. The latching pieces 251 on the upper side and the lower side of the damping spacer 25 are alternatively provided. One end (front end) of the damping spacer 25 is provided with a positioning body 252 corresponding to the positioning hole 213. The positioning body 252 projects from each of lateral sides of the damping spacer 25.

When the damping spacer 25 is to be mounted in the hollow portion 211 of the support 2, the positioning body 252 on one end (front end) of the damping spacer 25 is first inserted into the positioning hole 213 on one end of the hollow portion 211. Then, the latching pieces 252 on the upper side and lower side of the damping spacer 25 are latched respectively into the corresponding latching notches 212 on the upper side and lower side of the hollow portion 211, so that the damping spacer 25 can be latched and fixed into the hollow portion 211.

In another embodiment, the latching pieces 251 on the upper side and lower side of the damping spacer 25 are provided on the same side of the support 25 and cooperate with the latching pieces 251 and the positioning body 252 to fix the damping spacer 25 in the support 2.

Both lateral sides of the damping spacer 25 are formed with convex contacting surfaces 254. Both contacting surfaces 254 of the damping spacer 25 are convex from lateral sides of the main body 21 of the support 2, thereby to slidably contact both lateral sides of the electronic device module 5. However, in another embodiment, both contacting surfaces can be planar, concave or of other shapes. In another embodiment, both contacting surfaces of the damping spacer are used for slidable contact with both sides of the electronic module 5. In the present embodiment, both lateral sides of one end (front end) of the damping spacer 25 are formed respectively with inclined guiding-surfaces 255 for guiding the insertion of the electronic device module 5. The other end (rear end) of the damping spacer 25 is provided with a projection 253 projecting from each of lateral sides of the damping spacer 25 for pivoting to each of the two forks 41 (vibration-attenuating means) provided on the rear ends of both sides of the electronic device module 5. Therefore, the effect of attenuating vibration can be achieved. In another embodiment, the other end (rear end) of the damping spacer is not necessary to be provided with the guiding surfaces and/or projections.

In the present invention, the damping spacer 25 is provided in the hollow portion 211 of the support 2 for attenuating vibration. The damping spacer is provided between the electronic device modules 5 and the support 2. The elasticity of the damping spacer 25 made of soft materials is used to absorb the vibration between the support 2 and the electronic device modules 5. As a result, the removal of the removable carrier 4 can be smoother, and the vibration and noise can be reduced.

In the present invention, the damping spacer 25 is provided in the hollow portion 211 of the support 2. Therefore, the lateral space occupied by the sides of the support 2 is reduced and the manufacturing of the damping spacer is much easier. As a result, the remaining space is relatively increased. Accordingly, the usable lateral space in the housing 1 for accommodating the electronic device module 5 is thus increased, thereby the number of the accommodated electronic device modules 5 is increased. For example, in a 1U housing (with 44.5 mm height) of the embodiment of the present invention, at most six 2.5" hard disk drives can be horizontally arranged in the transverse direction. Although more hard disk drives are received in the same space, which means that the data storage capacity becomes larger, the volume of the housing 1 of the data storage device is not increased accordingly. For example, in the housing 1U of the embodiment, six 2.5" hard disk drives can be horizontally arranged in the transverse direction. Further, two rows (upper row and lower row) of the hard disk drives can be arranged in the vertical direction. Therefore, totally, twelve hard disk drives can be received. On the contrary, in a conventional 1U housing, only five hard disk drives of the same size can be arranged in the transverse direction, and thus only ten hard disk drives having the same size can be received, totally. Therefore, the data storage capacity in the housing 1U of the data storage device of the present invention is larger than that of the conventional art by 20%.

Further, in the present invention, the damping spacer 25 is provided in the hollow portion 211 of the support 2, thereby to lessen the collision between the removable carrier and the support. Therefore, the damping spacer 25 of the present invention can surely reduce the friction, vibration and noise. Moreover, the damping spacer 25 of the present invention is directly latched into the hollow portion 211 of the support 2. The assembly is simple and easy without using any screw or adhesive. Therefore, the cost can be efficiently reduced.

Although the present invention has been described with reference to the foregoing preferred embodiments, it will be understood that the invention is not limited to the details thereof. Various equivalent variations and modifications can still be occurred to those skilled in this art in view of the teachings of the present invention. Thus, all such variations and equivalent modifications are also embraced within the scope of the invention as defined in the appended claims.

What is claimed is:

1. A data storage device, comprising:
a plurality of electronic storage device modules;
a housing for receiving the plurality of electronic storage device modules therein;
a plurality of longitudinally extended supports provided at laterally spaced intervals within the housing for receiving the electronic storage device modules between respective adjacent laterally spaced pairs of the supports, each of the supports which are disposed between laterally adjacent pairs of the electronic storage device modules having at least one opening formed therethrough; and
a plurality of damping spacers respectively assembled in the openings of the plurality of supports to be in slidable contact with corresponding lateral sides of the electronic storage device modules disposed on opposing sides of each support, each damping spacer having two contacting surfaces projecting from opposing lateral sides of the corresponding support for slidably contacting the lateral sides of the electronic storage device modules; wherein the damping spacers are assembled in the openings for simultaneously attenuating vibration of the electronic storage device modules and decreasing a lateral space occupied by the support and the damping spacer.

2. The data storage device according to claim 1, wherein each support has a multi-layer structure, and each layer has the opening formed therethrough for mounting the damping spacer therein.

3. The data storage device according to claim 2, wherein the multi-layer structure of each support is integrally formed or formed by assembling one layer to another.

4. The data storage device according to claim 1, wherein each support comprises a main body and a plurality of supporting portions, the opening is formed through the main body.

5. The data storage device according to claim 4, wherein the supporting portions are perpendicular to the main body and extend in a transverse direction, and comprise a first supporting portion connected to an upper end of the main body, a second supporting portion connected to a lower portion of the main body, and at least one third supporting portion connected to a portion of the main body that is located between the upper end and the lower end.

6. The data storage device according to claim 4, wherein the supporting portions are connected to an upper end and a lower end of the main body, and the supporting portions are perpendicular to the main body and extend in a transverse direction.

7. The data storage device according to claim 1, wherein the electronic storage device module comprises a removable carrier and an electronic device mounted on the removable carrier.

8. The data storage device according to claim 7, wherein the removable carriers of the electronic storage device modules are disposed between the supports.

9. The data storage device according to claim 1, wherein an upper side and a lower side of the opening are respectively provided with a plurality of latching notches, an upper side and a lower side of each damping spacer are respectively provided with a plurality of latching pieces corresponding to the latching notches, and the latching pieces are latched into the latching notches.

10. The data storage device according to claim 1, wherein each of the supports disposed between laterally adjacent pairs of the electronic storage device modules has a positioning hole formed therein adjacent one end of the opening thereof, one end of the damping spacer is provided with a positioning body, and the positioning body is inserted into the positioning hole.

11. The data storage device according to claim 1, wherein a rear end of the damping spacer is provided with a projection projecting from opposing lateral sides of the damping spacer for pivoting to each of two forks provided on rear ends of the electronic storage device modules disposed on opposing sides of each support.

12. The data storage device according to claim 7, wherein the lateral sides of the damping spacer are formed with convex contacting surfaces projecting from both lateral sides of a corresponding support for slidable contact with respective removable carriers of the electronic devices disposed on opposing sides of the corresponding support.

13. The data storage device according to claim 1, wherein one end of the damping spacer is formed with an inclined guiding surface for guiding the insertion of a respective electronic storage device module.

14. The data storage device according to claim 1, wherein the damping spacer is made of an attenuating-vibration material.

15. The data storage device according to claim 14, wherein the attenuating-vibration material is rubber.

16. The data storage device according to claim 14, wherein the attenuating-vibration material is polypropylene.

17. A support for use within a data storage device, characterized in that the support is disposed between a pair of electronic storage device modules and has at least one opening formed therethrough, and a damping spacer assembled in the opening for slidable contact with respective lateral sides of the pair of electronic storage device modules located on opposing sides of the support for simultaneously attenuating vibration and decreasing a lateral space occupied by the support and the damping spacer, wherein the damping spacer having two contacting surfaces projecting from opposing lateral sides of the corresponding support for slidably contacting the lateral sides of the electronics storage device modules.

18. The support within the data storage device according to claim 17, wherein the support is of a multi-layer structure, and each layer is provided with an opening formed therethrough for mounting a respective damping spacer therein.

19. The support within the data storage device according to claim 18, wherein the multi-layer structure of the support is made by integrally formed or formed by assembling one layer to another.

20. The support within the data storage device according to claim 17, wherein the support comprises a main body and a plurality of supporting portions, the opening is formed through the main body.

21. The support within the data storage device according to claim 20, wherein the supporting portions are perpendicular to the main body and extend in the transverse direction, and comprises a first supporting portion connected to the upper end of the main body, a second supporting portion connected to the lower portion of the main body, and at least one third supporting portion connected to a portion of the main body that is located between the upper end and the lower end.

22. The support within the data storage device according to claim 20, wherein the supporting portions are connected to an upper end and a lower end of the main body, and the supporting portions are perpendicular to the main body and extend in a transverse direction.

23. The support within the data storage device according to claim 17, wherein an upper side and a lower side of the opening are respectively provided with a plurality of latching notches, an upper side and a lower side of the damping spacer are respectively provided with a plurality of latching pieces corresponding to the latching notches, and the latching pieces are latched into the latching notches.

24. The support within the data storage device according to claim 23, wherein the latching notches on the upper side and lower side of the opening are alternatively provided.

25. The support within the data storage device according to claim 17, wherein a positioning hole is provided adjacent one end of the opening of the support, one end of the damping spacer is provided with a positioning body, and the positioning body is inserted into the positioning hole.

26. The support within the data storage device according to claim 17, wherein a rear end of the damping spacer is provided with a projection projecting from opposing lateral sides thereof.

27. The support within the data storage device according to claim 17, wherein one end of the damping spacer is formed with an inclined guiding surface.

28. The support within the data storage device according to claim 17, wherein the damping spacer is made of an attenuating-vibration material.

29. The support within the data storage device according to claim 28, wherein the attenuating-vibration material is rubber.

30. The support within the data storage device according to claim 28, wherein the attenuating-vibration material is polypropylene.

31. The support within the data storage device according to claim 28, wherein the attenuating-vibration material is plastic.

32. The data storage device according to claim 14, wherein the attenuating-vibration material is plastic.

* * * * *